United States Patent
Bergerhoff

(10) Patent No.: US 6,834,179 B2
(45) Date of Patent: Dec. 21, 2004

(54) METHOD FOR OPERATING AN ACCESS CONTROL SYSTEM, IN PARTICULAR FOR A MOTOR VEHICLE, AND ACCESS CONTROL SYSTEM

(75) Inventor: Nikolas Bergerhoff, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 355 days.

(21) Appl. No.: 10/060,529

(22) Filed: Jan. 30, 2002

(65) Prior Publication Data

US 2002/0101330 A1 Aug. 1, 2002

(30) Foreign Application Priority Data

Jan. 30, 2001 (EP) .............................................. 01102067

(51) Int. Cl.⁷ .............................. G08B 5/22; H04B 7/00; H04B 1/00; H04B 1/06; H04B 7/02
(52) U.S. Cl. .............................. 455/59; 455/60; 455/61; 455/101; 455/102; 455/137; 455/273; 375/267; 340/5.63; 340/7.25
(58) Field of Search ................................ 340/5.7, 5.71, 340/5.72, 5.61–5.64, 10.1, 10.41; 455/59–61, 101–102, 137, 500; 375/267; 380/31

(56) References Cited

U.S. PATENT DOCUMENTS

| | | | | |
|---|---|---|---|---|
| 4,490,830 A | * | 12/1984 | Kai et al. ..................... | 375/299 |
| 4,509,093 A | * | 4/1985 | Stellberger ................. | 340/5.26 |
| 4,595,902 A | * | 6/1986 | Proske et al. .............. | 340/5.64 |
| 5,552,641 A | | 9/1996 | Fischer et al. | |
| 6,657,536 B1 | * | 12/2003 | Avenel ....................... | 340/5.61 |

FOREIGN PATENT DOCUMENTS

DE            43 29 697 C2     3/1995

* cited by examiner

*Primary Examiner*—Michael Horabik
*Assistant Examiner*—Kimberly Hamilton
(74) *Attorney, Agent, or Firm*—Laurence A. Greenberg; Werner H. Stemer; Gregory L. Mayback

(57) ABSTRACT

In the access control system, a code transmitter-end transceiver unit and a vehicle-end transceiver unit emit signals approximately synchronously on approximately the same carrier frequency. As a result of superimposition, a new code signal arises and its code information item is compared with an expected set point code information item. When there is correspondence, an enable signal for locking or unlocking or releasing the immobilizer is generated. The synchronous transmission/reception makes illegitimate monitoring more difficult.

15 Claims, 3 Drawing Sheets

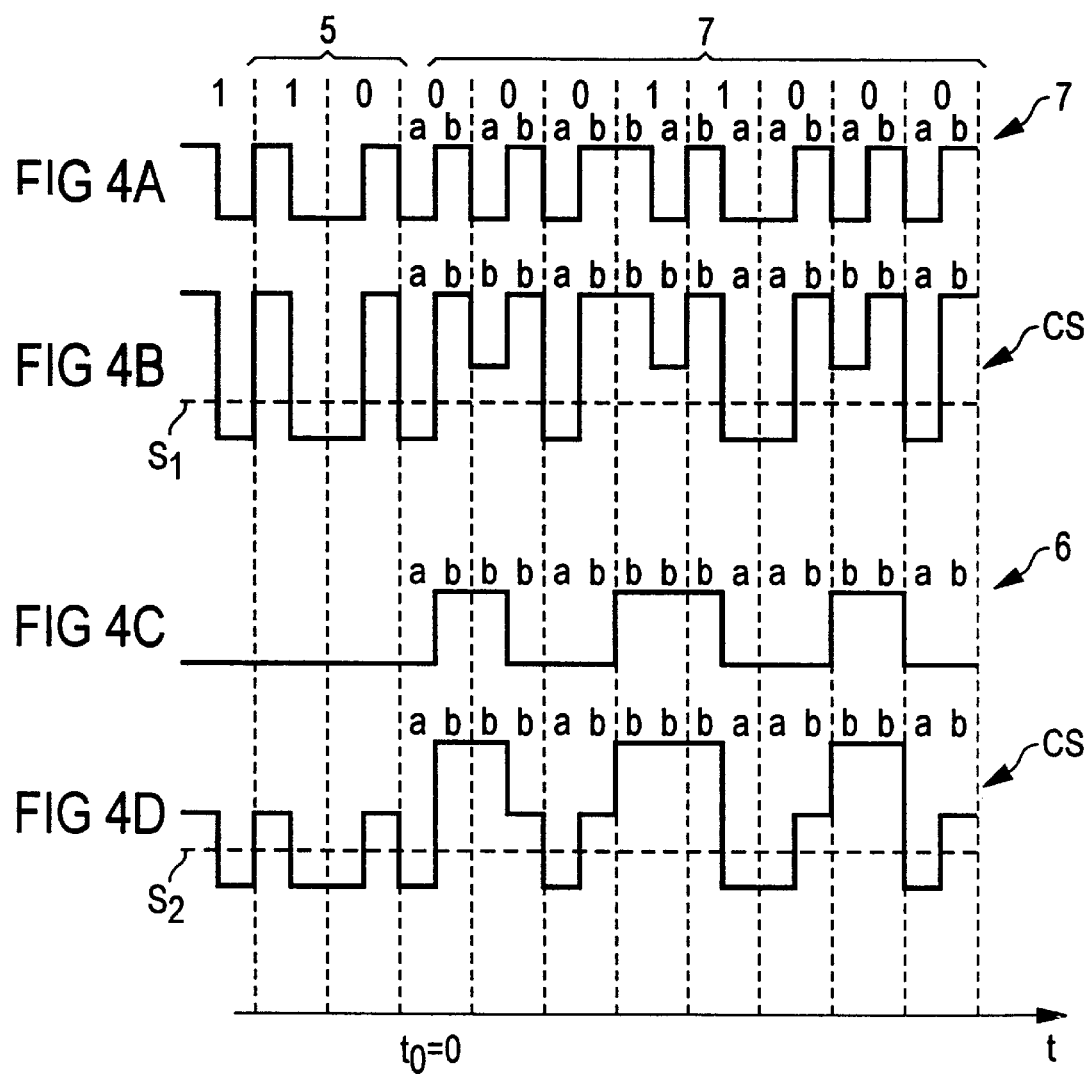

METHOD FOR OPERATING AN ACCESS CONTROL SYSTEM, IN PARTICULAR FOR A MOTOR VEHICLE, AND ACCESS CONTROL SYSTEM

BACKGROUND OF THE INVENTION

FIELD OF THE INVENTION

The invention relates to a method for operating an access control system, with which the access, in particular to a motor vehicle, is enabled only when authorization is proven by means of a code transmitter.

In a prior art anti-theft system (see U.S. Pat. No. 5,552,641 and German patent DE 43 29 697 C2), the user of the vehicle carries on his person what is referred to as an electronic code transmitter (for example in the form of a chip card) for unlocking his vehicle. As soon as an activation means on the motor vehicle, for example a door handle, is actuated, the vehicle-end control unit brings about the emission of a request signal. If the request signal is received in the code transmitter, the latter automatically transmits back its response code signal which is characteristic of it, in order to prove with the signal its authorization to use the motor vehicle. If the response code signal is recognized as being authorized, the doors of the motor vehicle are unlocked.

A challenge/response dialog, that is an enquiry with a challenge signal and a response with a response signal, takes place in an analogous fashion if the user is in the interior of the vehicle and wishes to start the vehicle. Given authorization of the code transmitter, the immobilizer is then released and the motor vehicle can be started.

Potential car thieves can monitor the signals which are transmitted in wireless fashion between the vehicle and the code transmitter and illegitimately reproduce them in order to obtain access to the motor vehicle.

SUMMARY OF THE INVENTION

It is accordingly an object of the invention to provide a method of operating an access control system and a corresponding access control system, especially for motor vehicles, which overcome the above-mentioned disadvantages of the heretofore-known devices and methods of this general type and wherein monitoring and reproduction of the transmitted signals is made more difficult. In particular, the intention is to check in the motor vehicle whether the received response signal originates from a legitimate code transmitter which is assigned to the motor vehicle, or whether the signal has in fact been reproduced by an unauthorized person.

With the foregoing and other objects in view there is provided, in accordance with the invention, a method of operating an access control system, in particular an access control system of a motor vehicle. The access control system includes a first transceiver unit in a portable code transmitter configured to emit a first signal upon being triggered; and a second transceiver unit in an access-controlled system (e.g., a motor vehicle) configured to emit a second signal upon being triggered;

The method comprises the following steps:
emitting the first signal with the first transceiver unit and, at least partially simultaneously and at a substantially equal carrier frequency, emitting the second signal with the second transceiver unit, whereby a superposition of the first signal and the second signal forms a code signal;

extracting a code information item from the code signal; and comparing the extracted code information item with a set point code information item, and generating an enable signal if correspondence is determined between the code information item and the set point code information item.

In other words, the objects are achieved by a method for operating an access control system in which a dialog takes place between the motor vehicle and the code transmitter on the same carrier frequency. At the same time, both a vehicle-end transceiver unit and an electronic code transmitter transmit within predefined time periods (overlapping of transmission phases). As a result, the emitted signals overlap in these time periods. The overlapping signal which arises in this way is the new characteristic code signal whose coded contents are evaluated and checked for authorization.

For a potential thief there is the problem that at one location (within the transmission and reception range of the transceiver unit of the vehicle or in the transmission and reception range of the code transmitter) he must, on the one hand, reproduce a monitored signal and at the same time monitor a signal on the same carrier frequency. This is largely prevented with the method according to the invention because the synchronous transmission of the monitored signal interferes with the receiver used for the monitoring (same carrier frequency).

In accordance with an added feature of the invention, the extracting step comprises extracting the code signal in the portable code transmitter and in the access-controlled system, the comparing step comprises comparing the code information item in the portable code transmitter and in the access-controlled system with a respective set point code information item, and the generating step comprises generating the enable signal only if correspondence is determined in the portable code transmitter and in the access-controlled system.

In accordance with an additional feature of the invention, a start signal is emitted with the first transceiver unit or with the second transceiver unit, and a transmission of the first signal and of the second signal is started a fixed time period after receiving the start signal.

In accordance with another feature of the invention, a challenge/response dialog is triggered between the portable code transmitter and the access-controlled system upon receiving the enable signal, and/or the enable signal is forwarded to a security assembly in the motor vehicle, whereupon the security assembly is released when authorization is proven.

In accordance with a further feature of the invention, in order to generate the first signal and the second signal, a respectively corresponding code secret is stored in the access-controlled system and the in portable code transmitter.

Preferably, the first signal and the second signal are generated by newly calculating the first and second signals with a computational algorithm in such a way that at every transmission the code signal contains a new code information item.

It is also possible for the first signal and the second signal to be generated by newly calculating the first and second signals with a computational algorithm in such a way that at every transmission the code secret is transmitted in encrypted form at a start of each transmission.

In a preferred embodiment of the invention, the signals are emitted at conventional carrier frequencies of approximately 315 MHz, approximately 433 MHz, or approximately 868 MHz.

In accordance with an added feature of the invention, a start information item is emitted with the portable code transmitter a start at the start of the first signal, whereby the second transceiver unit is synchronized to the portable code transmitter.

In accordance with an additional feature of the invention, after the challenge/response dialog is successfully terminated, a further enable signal is generated with which the security assembly is enabled.

Finally, it is possible for the second transceiver unit and the first transceiver unit to transmit and receive signals synchronously.

With the above and other objects in view there is also provided, in accordance with the invention, an access control system, comprising:

a first transceiver unit in a portable code transmitter configured to emit a first signal upon being triggered; and a second transceiver unit in an access-controlled system configured to emit a second signal upon being triggered; wherein the first transceiver unit and the second transceiver unit emitting the first signal and the second signal at least temporarily overlapping and at a substantially equal carrier frequency, whereby a superposition of the first signal and the second signal forms a code signal;

whereby the code signal arising from the superimposition of the first signal and of the second signal is received by the first transceiver unit and by the second transceiver unit, and the first and second transceiver units are configured to extract a code information item from the code signal; and a comparator in at least one of the portable transmitter and the access-controlled system for comparing the respectively extracted code information item with a set point code information item, and wherein an enable signal is generated if correspondence is found between the code information item and the set point code information item.

In accordance with a concomitant feature of the invention, the access-controlled system is a motor vehicle.

Other features which are considered as characteristic for the invention are set forth in the appended claims.

Although the invention is illustrated and described herein as embodied in a method for operating an access control system, in particular for a motor vehicle, and access control system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2, 3 and 4A to 4D show pulse diagrams of signals which are transmitted between the vehicle and the code transmitter in the anti-theft system according to FIG. 1.

DESCRIPTION OF THE PREFERRED EMBODIMENTS

Figure 1:
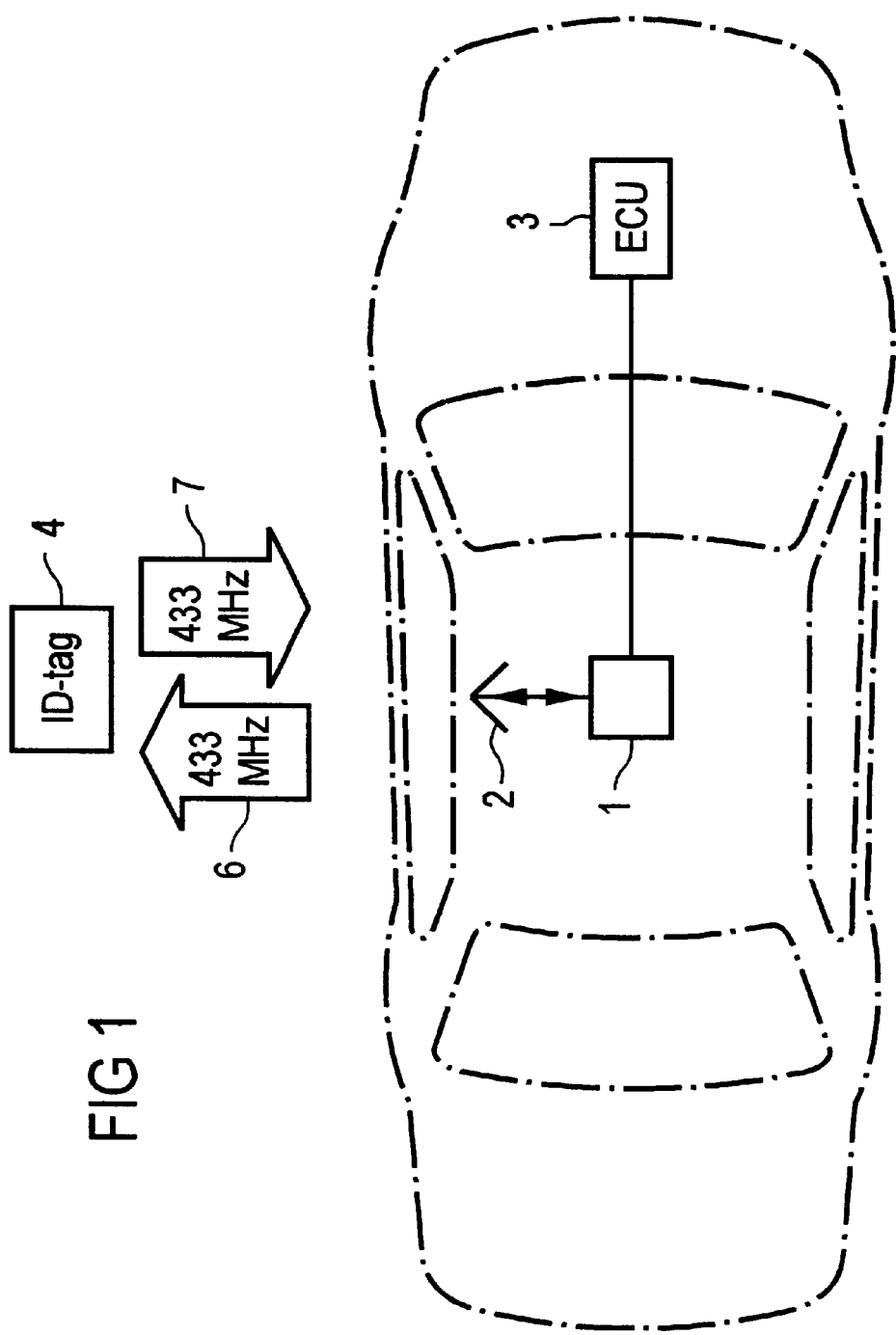
FIG. 1 shows a motor vehicle with an anti-theft system according to the invention.

Referring now to the figures of the drawing in detail and first, particularly, to FIG. 1 thereof, an anti-theft system for a motor vehicle has a vehicle-end transceiver unit 1 which can emit and receive signals via one or more antennas 2. The transceiver unit 1 is controlled by a control unit 3 for transmitting or receiving and for modulating or demodulating signals. The evaluation of the received and demodulated signals preferably takes place in the control unit 3.

In addition, the anti-theft system has a portable code transmitter 4 (referred to in FIG. 1 as an ID tag) which also has a transceiver unit. The code transmitter-end transceiver unit can transmit and receive signals via one or more non-illustrated antennas. In particular, it transmits a code information item which is characteristic of the code transmitter 4 and with which the code transmitter 4 proves its authorization to lock or unlock the motor vehicle or to release the immobilizer.

The lock system and the immobilizer are security assemblies which can be controlled by means of the code transmitter 4 given authorization.

Figure 2:
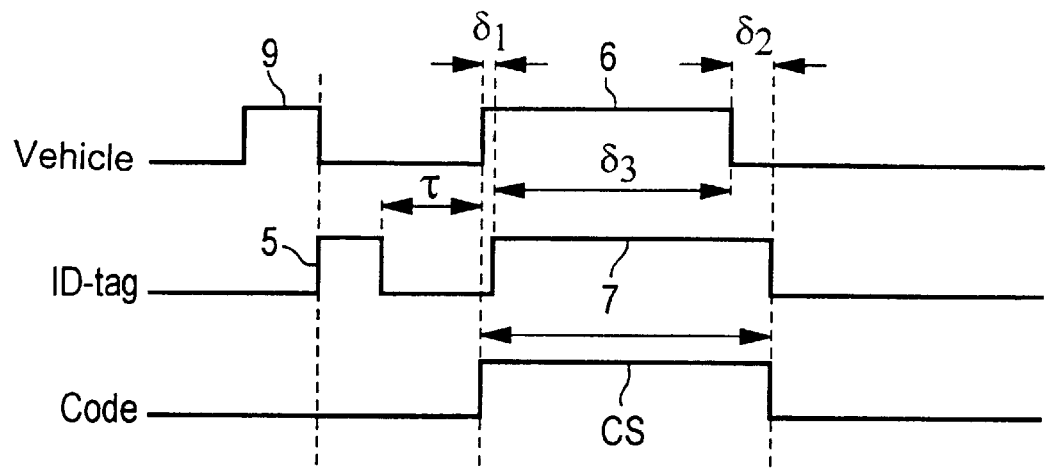

With reference to FIG. 2, if a user manually actuates a triggering means (door handle or switch on or in the vicinity of the door handle) on the motor vehicle, a wake-up signal 9 is firstly emitted by the vehicle-end transceiver unit 1. If a code transmitter 4 receives the wake-up signal 9, it firstly transmits a start signal 5, which has the purpose of bringing about chronological synchronization between the transceiver unit of the code transmitter 4 and the transceiver unit 1 of the vehicle.

Directly after the emission or even after a fixed time period $\tau+\delta_1$ after the emission of the start signal 5, the code transmitter 4 transmits a first signal 7. Directly after the reception or even after a fixed time period $\tau$ after the reception of the start signal 5, the vehicle transmits a second signal 6 in a chronologically overlapping fashion (overlapping the time period $\delta_3$) with the first signal 7.

The start signal 5 can, of course, also be emitted by the transceiver unit 1 in the motor vehicle in order to synchronize the code transmitter 4 and the vehicle-end transceiver unit 1.

The essential feature for the invention is that the first signal 7 and the second signal 6 are emitted approximately synchronously on the same carrier frequency, so that the two signals 6 and 7 overlap partially or chronologically in certain periods (by the time period $\delta_3$ in the exemplary embodiment). As a result of the fact that the two signals are transmitted approximately synchronously, a superimposition signal (referred to below as code signal CS) which is received both by the code transmitter-end transceiver unit and by the vehicle-end transceiver unit 1 arises.

The code signal CS contains a code information item which is composed of the code information items of the first and of the second signal 6, 7, and can be evaluated both by the transceiver unit 1 and by the code transmitter 4.

For this purpose, the code information item is compared with a set point code information item. Only if there is correspondence with the set point code information item is an enable signal generated, as a result of which either the security assemblies are enabled or an challenge/response dialog between the motor vehicle and the code transmitter 4 is triggered, which dialog can then lead to the security assembly being enabled if there is authorization. In the challenge/response dialog there is no longer any need for chronological overlapping of the signals 6 and 7.

The first signal 7 and the second signal 6 are emitted on approximately the same carrier frequency in a chronologically overlapping fashion and are advantageously amplitude-modulated (AM modulation). One possibility for the AM modulation is the OOK (On-Off Keying), wherein the carrier signal is switched on and off in the clock of the modulation. Instead of switching off the carrier signal completely, it can also be transmitted with greatly reduced amplitude.

Binary signals are transmitted with a specific electrical signal shape. All known methods are possible for this, for example the NRZ method or the Manchester coding method (cf. FIG. 3). The Manchester coding method is advantageously used in motor vehicle engineering because it is particularly suitable for clock recovery, and thus for bringing about synchronization between the transmitter and receiver.

Figure 3:
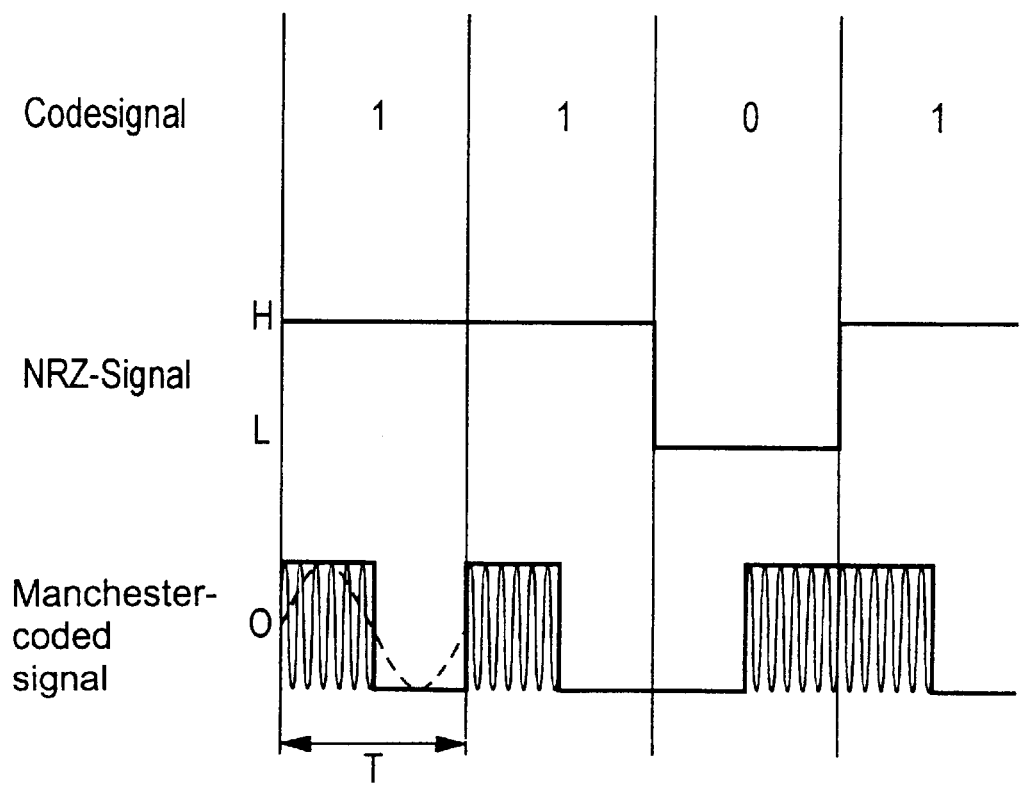

In FIG. 3, part of a binary code information item with the logic values "0" and "1" of the individual bit is illustrated. This code information item can be represented by NRZ signals (Non Return to Zero) with the logic states "H" and "L" for each bit. Such a signal can be represented, for example, in the Manchester code (coded format). In the Manchester code, a carrier oscillation (which oscillates with the carrier frequency) within a bit (i.e. within the pulse period T of a single bit) is keyed once completely (or even only partially, that is to say with reduced amplitude) and is not keyed at all once with respect to the amplitude (also referred to as on-off keying). A signal with the logic value "1" is generated by a pulse of the length T/2 in the first half of the pulse period T, while a signal with the value "0" is generated by a pulse train with the length T/2 in the second half. The envelope curve which is actually obtained (ideally it would be a square-wave oscillation) is illustrated by a dotted line in a sinusoidal shape in FIG. 3.

The signals 6 and 7 are structured in such a way that in specific time periods $\delta_1$, only the vehicle-end transceiver unit 1 transmits, in specific time periods $\delta_2$ only the code transmitter-end transceiver unit transmits, and in specific time periods $\delta_3$ both the vehicle and the code transmitter emit a carrier oscillation synchronously (cf. FIG. 2). The code signal CS comprises the entire time period $\delta_1+\delta_2+\delta_3$.

The individual pulse trains of the respective signals 6, 7 do not need to have uniform signal periods. They can have a different signal period at each emission. The signal periods can be generated, for example, by random generators in the transceiver unit 1 and/or code transmitter 4. To make correct detection of the transmitted code information items possible, the respective signal period of the respectively received unit is fed into in encrypted form.

Carrier frequencies of 315 MHz, 433 MHz or 868 MHz are advantageously used because they are already used today for radio remote control in motor vehicle equipment and have also received approval in a large number of countries. Of course, other carrier frequencies can also be used. However, it is a precondition that both the vehicle-end transceiver unit 1 and the code transmitter-end transceiver unit operate with the same carrier frequency.

The generation of the code signal CS from the first signal 7 and from the second signal 6 will be explained in more detail below by way of example with reference to FIGS. 4A to 4D. Here, the start signal 5 and the first signal 7 of the code transmitter 4 are illustrated in FIG. 4A in the form wherein they are transmitted by said code transmitter 4.

FIG. 4B illustrates a signal such as is received by the code transmitter 4. FIG. 4C illustrates the second signal 6 which is emitted by the transceiver unit 1, and FIG. 4D illustrates a signal such as is received by the transceiver unit 1 in the motor vehicle.

The signal illustrated in FIG. 4A is advantageously a valid Manchester-coded signal (indicated by the numerals "1" and "0"). The letter "a" marks, in FIGS. 4A to 4D, time periods wherein no carrier signal can be transmitted or received. The letter "b" marks time periods wherein a carrier signal is transmitted or received. In FIGS. 4B and 4D, the height of the signal periods illustrated indicates the reception field strength (amplitude). This is always particularly high if the local transmitter transmits a carrier signal because the receiver receives more strongly a carrier signal which is emitted in the direct vicinity than a carrier signal which is transmitted from a remote transmitter.

In addition, FIGS. 4B and 4D also show decision thresholds $S_1$ and $S_2$. Below the respective decision threshold $S_1$ or $S_2$, the respective receiver decides on "no carrier signal" (corresponds to the state "a"), and above the decision threshold the respective receiver decides on "carrier signal present" (corresponds to the state "b").

In the invention, the second signal 6 is emitted via the transmitting antenna 2 of the vehicle-end transceiver unit 1, and the first signal 7 is emitted via the transmitting antenna (not illustrated) of the code transmitter 4. On the one hand the signal transmitted by its own transmitting antenna and the signal transmitted by the opposite end are received by means of the respective receiving antennas.

However, one end receives only the signal emitted by itself as long as its amplitude is greater than zero (i.e. this end is in this case "deaf" for the other end) and one end then only receives the signal of the other end and if it does not transmit itself (i.e. the transmission amplitude is zero). For this reason, the code transmitter 4 and the vehicle-end transceiver unit 1 are tuned to one another with respect to the emitted code information item. This can be fed into the parts when the parts are programmed at the end of the line at the vehicle manufacturer or can be newly calculated by a computational algorithm before each transmission (computational algorithm is implemented in an initialization or programming operation).

The code transmitter 4 firstly starts with a number of start bits (start signal 5; cf. FIG. 4A), as a result of which the code transmitter 4 and the vehicle-end transceiver unit 1 are synchronized. Both the vehicle-end transceiver unit 1 and the code transmitter 4 can emit a start signal 5, the transmission of the first signal 7 and of the second signal 6 as a result of the received start signal 5 being started at a fixed time period after that.

In the exemplary embodiment, the code transmitter 4 transmits a number of start bits and then the code information item "ababbabbabaababab" (FIG. 4A). Before or after the code information item it is also possible to transmit further control information items which must not influence the code information item.

The vehicle-end transceiver unit 1 transmits its code information item approximately synchronously with the code information item of the code transmitter 4, specifically "abbaaabbbaaabbaa" in the present exemplary embodiment (FIG. 4C). According to FIG. 4B, the code transmitter 4 receives both the code information item emitted by it itself (this is largely unattenuated, i.e. with somewhat large amplitude) and the code information item of the vehicle-end transceiver unit 1 (this is somewhat attenuated, i.e. with somewhat smaller amplitude, because the code transmitter 4 and the transceiver unit 1 are at a distance from one another).

However, the code transmitter 4 does not "monitor" those amplitudes of the oscillation states of the code information item emitted by the vehicle-end transceiver unit 1 at those times at which the oscillation states are those of its own transmitted code information item "b".

The code transmitter 4 has a threshold value switch with a threshold value $S_1$. According to the received amplitudes, the code transmitter 4 evaluates the signal by comparison with the threshold value $S_1$. All the amplitudes which are greater than the threshold value $S_1$ are evaluated as oscillation state "b", while all the amplitudes which are smaller than the threshold value $S_1$ are evaluated as oscillation state "a". The code transmitter 4 thus evaluates the code information item CS: "abbbabbbbaabbbab" from the received superimposition signal.

According to FIG. 4D, the vehicle-end transceiver unit 1 receives both the code information item emitted by it itself (this is largely unattenuated, i.e. with somewhat larger amplitude) and the code information item of the code transmitter 4 (this is somewhat attenuated, i.e. with somewhat smaller amplitude because the code transmitter 4 and the transceiver unit 1 are at a distance from one another).

The vehicle-end transceiver unit 1 also has a threshold value switch with a threshold value $S_2$. The vehicle-end transceiver unit 1 evaluates the received signal in accordance with the received amplitudes. All the amplitudes which are greater than the threshold value $S_2$ are evaluated as oscillation state "b", while all the amplitudes which are smaller than the threshold value $S_2$ are evaluated with the oscillation state "a". In this way, the transceiver unit 1 obtains the code information item CS: "abbbabbbbaabbbab" from the received superimposition signal, which code information item is correctly identical to that of the code transmitter 4.

An unauthorized person in the region of the code transmitter 4 who monitors the code signal received there can only reproduce said code signal with errors so that no authorization can then be proved.

The reliability of the method can be additionally increased by differentiating not only between the states "a" and "b" but also by additionally evaluating the absolute amplitude level of the received signal.

The set point code information can be stored as a corresponding code secret either in the vehicle-end transceiver unit 1 or in the control unit 3. Only if the received code information item of the code signal CS corresponds to the set point code information is an enable signal for enabling a security assembly generated.

The set point code information item can also be stored as a corresponding code secret in the code transmitter 4. Only if the code information item received by it is identical to the set point code information item is the code transmitter 4 enabled further functions and further transmission of signals (for example further challenge/response dialog which can only then lead to the enabling of the security assembly).

The code information item is advantageously compared with the set point code information item both in the code transmitter 4 and at the vehicle end in the transceiver unit 1 or in the control unit 3. Only in this way is it possible to force a potential thief to have to transmit and monitor in both directions synchronously, in order to be able to simulate a correct code signal CS. However, as previously described, synchronous transmission and monitoring can be achieved only with extreme difficulty owing to the same carrier frequency, so that effective protection against manipulation is provided.

The set point code information item and the code information item can also be generated from a code secret stored in the code transmitter 4 or in the vehicle-end transceiver unit 1/control unit 3, using a mathematical algorithm or some other logic connection. The code secret is fed to the parts during an initialization operation and permanently stored in a way which is protected against reading out from the outside.

The vehicle-end transceiver unit 1 and the control unit 3 can be accommodated in a common housing. The vehicle-end transceiver unit 1 can have a single transmitting and receiving antenna 2, provided that this antenna 2 can transmit and receive synchronously. Transmitting and receiving antennas which are separated from one another can also be arranged in the motor vehicle. A plurality of transmitting antennas and a plurality of receiving antennas can also be arranged in the motor vehicle and also on the code transmitter 4.

The antennas 2 are arranged distributed in the motor vehicle and are configured in such a way that, as far as possible, all the regions in the motor vehicle or in the direct vicinity of the motor vehicle are penetrated with an electromagnetic field using one transmission signal (this corresponds to the range of the signals). Conversely, signals are then reliably received from these regions.

The term code transmitter 4 is to be understood—irrespective of its external form—as a device which receives a signal and transmits back a coded signal. The code transmitter 4 can be arranged here on a chip card/check card, in a keygrip or other housings. The code transmitter 4 can be used as a security assembly for remotely controlling a locking system of a motor vehicle and an immobilizer without using a mechanical key. The code transmitter 4 usually has a transponder which automatically transmits back a signal as a result of a received signal.

The transponder usually obtains its voltage supply for the transmission of a signal from the electromagnetic field of the received signal. The transponder can also be supplied with power via its own battery or via a storage battery.

The challenge/response dialog is to be understood as being a bidirectional communication between the transceiver unit and the code transmitter 4, during which communication a first, received enquiry signal serves as a trigger for the emission of a response signal. A plurality of challenge/response dialogs can also take place, in order to prove authorization for releasing the immobilizer or for locking and unlocking the locking system.

The first signal 7, the second signal 6 and the enable signal (as well as the enquiry signal and the response signal of the challenge/response dialog) are coded signals which each have a code information item. The code information item is a binary coded information item which has a large number of bit places. As a result of the coding/encrypting, the code information item changes at each new encryption process. The code information item can be preceded or followed by a plurality of bits which may be required for a reliable transmission of data. The code information item which is extracted from a received signal is compared with a stored or generated set point code information item.

The first signal 7 and the second signal 6 can also be divided into a plurality of sections and each emitted in sections, the respective sections also being transmitted with at least partial chronological superimposition.

The method for operating an access control system is not restricted to use only in a motor vehicle. It can also be used in other objects such as buildings, security rooms, garages, personal computers, mobile telephones, ATMs, chip cards or other devices wherein there is an interrogation for authorization for access control or for use.

I claim:

1. A method of operating an access control system, the access control system including:

a first transceiver unit in a portable code transmitter configured to emit a first signal upon being triggered; and a second transceiver unit in an access-controlled system configured to emit a second signal upon being triggered;

the method which comprises the following steps:

emitting the first signal with the first transceiver unit and, at least partially simultaneously and at a substantially equal carrier frequency, emitting the second signal with the second transceiver unit, whereby a superposition of the first signal and the second signal forms a code signal;

extracting a code information item from the code signal; and comparing the extracted code information item with a set point code information item, and generating an enable signal if correspondence is determined between the code information item and the set point code information item.

2. The method according to claim 1, wherein the access control system is a motor vehicle access control system and the second transceiver unit is disposed in the motor vehicle.

3. The method according to claim 1, wherein the extracting step comprises extracting the code signal in the portable code transmitter and in the access-controlled system, the comparing step comprises comparing the code information item in the portable code transmitter and in the access-controlled system with a respective set point code information item, and the generating step comprises generating the enable signal only if correspondence is determined in the portable code transmitter and in the access-controlled system.

4. The method according to claim 1, which comprises emitting a start signal with the first transceiver unit or with the second transceiver unit, and starting a transmission of the first signal and of the second signal a fixed time period after receiving the start signal.

5. The method according to claim 1, which comprises triggering a challenge/response dialog between the portable code transmitter and the access-controlled system upon receiving the enable signal.

6. The method according to claim 2, which comprises forwarding the enable signal to a security assembly in the motor vehicle, whereupon the security assembly is released when authorization is proven.

7. The method according to claim 1, wherein, in order to generate the first signal and the second signal, a respectively corresponding code secret is stored in the access-controlled system and the in portable code transmitter.

8. The method according to claim 1, which comprises generating the first signal and the second signal by newly calculating the first and second signals with a computational algorithm in such a way that at every transmission the code signal contains a new code information item.

9. The method according to claim 1, which comprises generating the first signal and the second signal by newly calculating the first and second signals with a computational algorithm in such a way that at every transmission the code secret is transmitted in encrypted form at a start of each transmission.

10. The method according to claim 1, which comprises emitting the signals at a carrier frequency selected from the group of frequencies consisting of approximately 315 MHz, approximately 433 MHz, and approximately 868 MHz.

11. The method according to claim 1, which comprises emitting with the portable code transmitter a start information item at the start of the first signal, whereby the second transceiver unit is synchronized to the portable code transmitter.

12. The method according to claim 6, which comprises, after the challenge/response dialog is successfully terminated, generating a further enable signal with which the security assembly is enabled.

13. The method according to claim 1, wherein the second transceiver unit and the first transceiver unit are configured to transmit and receive signals synchronously.

14. An access control system, comprising:

a first transceiver unit in a portable code transmitter configured to emit a first signal upon being triggered; and a second transceiver unit in an access-controlled system configured to emit a second signal upon being triggered;

wherein said first transceiver unit and said second transceiver unit emitting the first signal and the second signal at least temporarily overlapping and at a substantially equal carrier frequency, whereby a superposition of the first signal and the second signal forms a code signal;

whereby the code signal arising from the superimposition of the first signal and of the second signal is received by said first transceiver unit and by said second transceiver unit, and said first and second transceiver units are configured to extract a code information item from the code signal; and a comparator in at least one of said portable transmitter and said access-controlled system for comparing the respectively extracted code information item with a set point code information item, and wherein an enable signal is generated if correspondence is found between the code information item and the set point code information item.

15. The access control system according to claim 14, wherein said access-controlled system is a motor vehicle.

* * * * *